F. B. EBERT.
SAFETY TRUCK FRAME.
APPLICATION FILED DEC. 18, 1908.
918,521.
Patented Apr. 20, 1909.
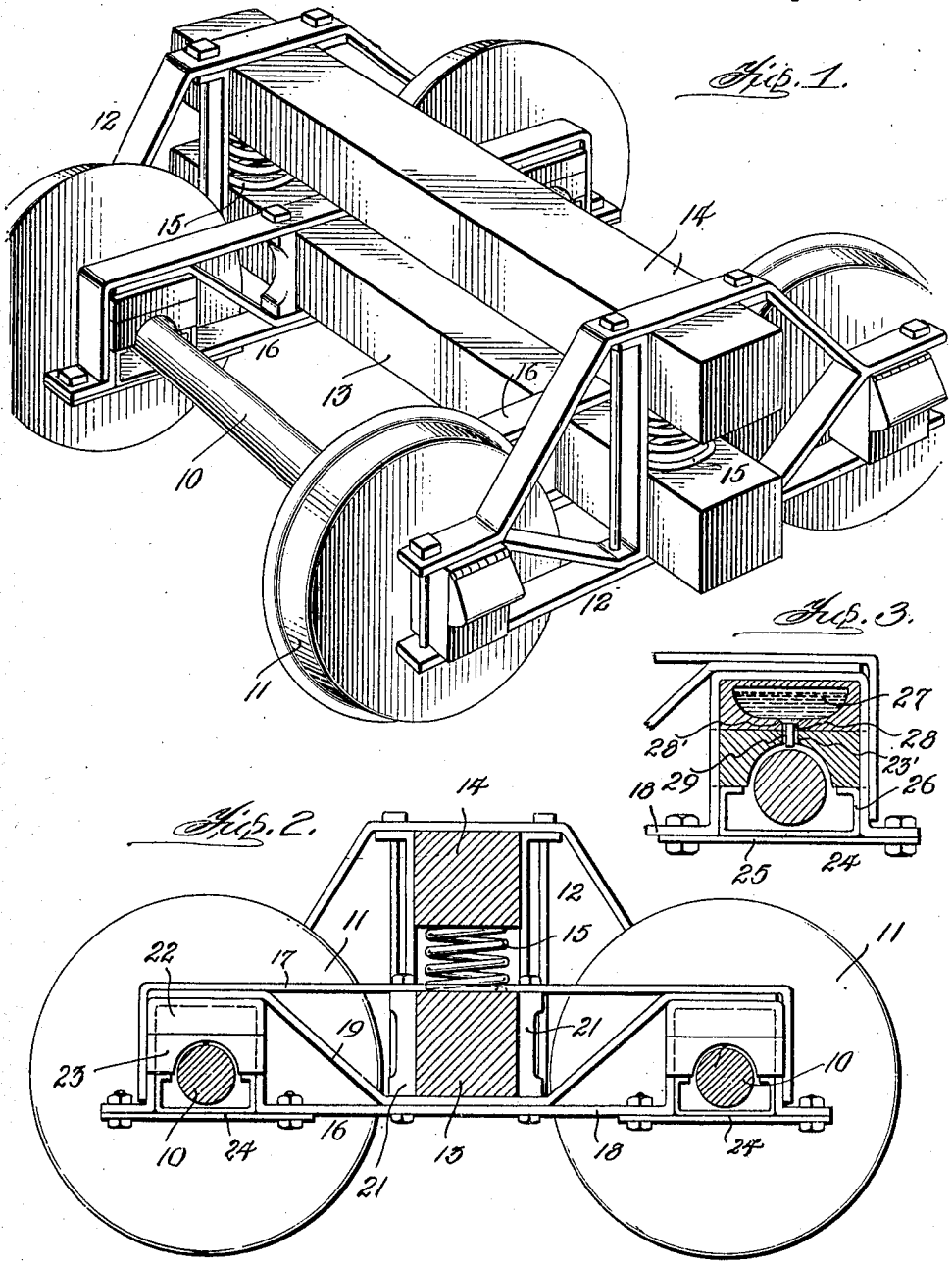
Witnesses
Inventor
F. B. Ebert,
By Beeler & Cobb
Attorneys

UNITED STATES PATENT OFFICE.

FRANK B. EBERT, OF HUMBOLDT, KANSAS.

SAFETY TRUCK-FRAME.

No. 918,521.  Specification of Letters Patent.  Patented April 20, 1909.

Application filed December 18, 1908. Serial No. 468,232.

*To all whom it may concern:*

Be it known that I, FRANK B. EBERT, a citizen of the United States, residing at Humboldt, in the county of Allen and State of Kansas, have invented certain new and useful Improvements in Safety Truck-Frames, of which the following is a specification.

This invention relates to railway rolling-stock, and has particular reference to an improved form of safety appliance for railway car trucks, hereinafter fully set forth and claimed and illustrated in the accompanying drawings, in which—

Figure 1 is a perspective view of a conventional form of car truck having attached thereto the safety frames constituting the subject-matter of this invention; Fig. 2 is a cross sectional view, indicating the inner face of a pair of side wheels and a safety frame secured in place, and Fig. 3 is a sectional detail hereinafter fully described.

Throughout the following detail description and on the several figures of the drawings similar parts are referred to by like reference characters.

A very large proportion of the accidents which occur on railroads are due to a disabled or broken box or journal, which are usually located on the outside of the wheels. In the event of a broken journal, the axle and wheels attached thereto are liable to become displaced from the rails, with the usual well known disastrous results.

The aim of this invention is to provide a simple attachment for use in connection with car trucks of well known form to prevent the displacement of a wheel from the rail in the event of wreckage of a journal of the axle to which said wheel is connected.

As indicated in the drawings, a pair of axles 10 having wheels 11 secured thereto in the ordinary manner are connected by truck frames 12 at the axle journals. There is also employed a lower transom or spring plank 13 and an upper transom 14, between which are arranged the usual springs 15 of any suitable construction. Each frame 12 consists of a trussed structure having rigid connection with the transom 13 and within which the upper transom 14 operates, the weight of the car being borne directly upon the transom 14 and ultimately by the transom 13 supported by the wheels, axles, and truck frames 12.

Secured to the transom 13 in a substantially rigid and permanent manner, and adjacent to the inner faces of each pair of side wheels of the truck, is a safety frame 16 comprising a trussed frame having an upper bar 17, a lower bar 18, and an intermediate bar 19. Said lower and intermediate bars are spaced vertically from the upper bar, but are united at the ends to said upper bar forming U-shaped sockets to receive the bearing members. A pair of vertical spacing members 21 extend between the upper and intermediate bars and closely embrace the transom 13, constituting means for securing the safety frame to said transom. In each of the U-shaped sockets are arranged bearing elements consisting of a lubricant box 22 at the top of said socket, and against which is a bearing brass 23, the lower face of which is shaped to conform with the form of the axle which is received loosely therein but spaced normally therefrom to any suitable distance, for instance one-half an inch under ordinary circumstances. The bearing members 22 and 23 are provided with projecting end flanges which embrace the walls of the U-shaped sockets, and thereby are prevented from displacement therefrom.

The bottom of each U-shaped socket is spanned by a closure 24 consisting of a strong metallic plate 25, secured to the bent portion of the lower bar 18, and to said plate are connected flanged extensions 26 which extend upwardly therefrom and engage the lower portions of the brass 23 to prevent the latter from dropping downwardly into contact with the axle. The closure 24 serves also as an effective means to prevent the falling of an axle in the event of breakage thereof adjacent to the inner surface of the wheel.

The box 22 is provided with an oil cavity 27 having an outlet 28. Said outlet is provided at its upper end with a conical seat 28', within which is normally seated a valve 29 having a head which closes said opening. The lower end of the valve projects slightly through the lower end of a port 23' of the brass 23 and which registers with the port 28 of the box. Under ordinary conditions the body of oil contained in the cavity 27 is retained therein, but when the brass is brought into engagement with the axle the lower end of the valve stem is lifted thereby, permitting the oil to flow upon the axle to lubricate the same. In the event of breakage of the journal, as above suggested, or disability of a box carried by the frame 12 the transoms 13 and 14 will cause the safety frame 16 to drop into play, thereby sustaining the weight of the car upon the axle or axles on the inside of the wheel, thereby saving accident or disaster.

The safety frames are comparatively inexpensive to build and may readily be applied to car trucks of ordinary construction now in use.

Having thus described the invention, what is claimed as new, is:

1. In a safety railway truck, the combination with the usual axles, wheels, transom, and end frames, of a safety frame rigidly secured to said transom adjacent to the inner faces of a side pair of wheels, said safety frame having U-shaped sockets embracing the axles, a boxing carried at the upper portion of each socket, and a brass curved to conform to the shape of the axle carried adjacent to said boxing and slightly spaced normally from the axle.

2. The herein described saftey frame for railway trucks, comprising a rigid trussed structure having at each end a U-shaped socket, a lubricant box carried at the upper end of each socket, a brass carried in each socket against the lower face of said box, and a closure for the lower end of each socket comprising a rigid plate connected to the frame structure and having means extended upward therefrom to maintain said brass in elevated position.

In testimony whereof I affix my signature in presence of two witnesses.

FRANK B. EBERT.

Witnesses:
V. A. SNEERENGER,
G. W. DICKINSON.